US006761489B1

(12) United States Patent
Dean, Jr. et al.

(10) Patent No.: US 6,761,489 B1
(45) Date of Patent: Jul. 13, 2004

(54) FERRULE HAVING FIRST AND SECOND BODY PORTIONS WITH DIFFERENT NOMINAL WIDTHS AND AN ASSOCIATED MOLD AND FABRICATION METHOD

(75) Inventors: David L. Dean, Jr., Hickory, NC (US); Alan J. Malanowski, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/460,552

(22) Filed: Dec. 14, 1999

(51) Int. Cl.[7] .................................................. G02B 6/36
(52) U.S. Cl. ............................ 385/78; 385/60; 385/72
(58) Field of Search ............................ 385/60, 63, 72, 385/76, 77, 78, 80, 81, 85

(56) References Cited

U.S. PATENT DOCUMENTS

| | | | |
|---|---|---|---|
| 4,834,487 A | 5/1989 | Abendschein et al. | 350/96.2 |
| 5,375,183 A | 12/1994 | Edwards et al. | 385/60 |
| 5,926,596 A | * 7/1999 | Edwards et al. | 385/78 |
| 6,045,270 A | * 4/2000 | Weiss et al. | 385/59 |

FOREIGN PATENT DOCUMENTS

| | | | |
|---|---|---|---|
| JP | 56-155911 | 12/1981 | G02B/7/26 |
| JP | 61-113011 | 5/1986 | G02B/6/36 |

OTHER PUBLICATIONS

Patent Abstract of Japan, 56155911, Dec. 2, 1981.
Patent Abstract of Japan, 61113011, May 30, 1986.

* cited by examiner

*Primary Examiner*—Mark A. Robinson
*Assistant Examiner*—Alessandro Amari

(57) ABSTRACT

A ferrule is provided that has an exterior surface that can be defined with sufficient precision to serve as a datum during subsequent polishing operations. The ferrule includes first and second ferrule body portions that are joined along a parting line. The first ferrule body portion has a first width and the second ferrule body portion has a second width that is less than the first width, such as by at least 50 microns. In addition, the width of the first ferrule body portion is defined to be within a first tolerance, while the width of the second ferrule body is defined to be within a second tolerance that is larger than the first tolerance. As such, the first ferrule body portion is not only larger than the second ferrule body portion, but the first ferrule body portion is also more precisely defined. Thus, only one portion of the ferrule of the present invention needs to be precisely defined. A mold for forming the ferrule and a method of fabricating the ferrule are also provided.

28 Claims, 2 Drawing Sheets

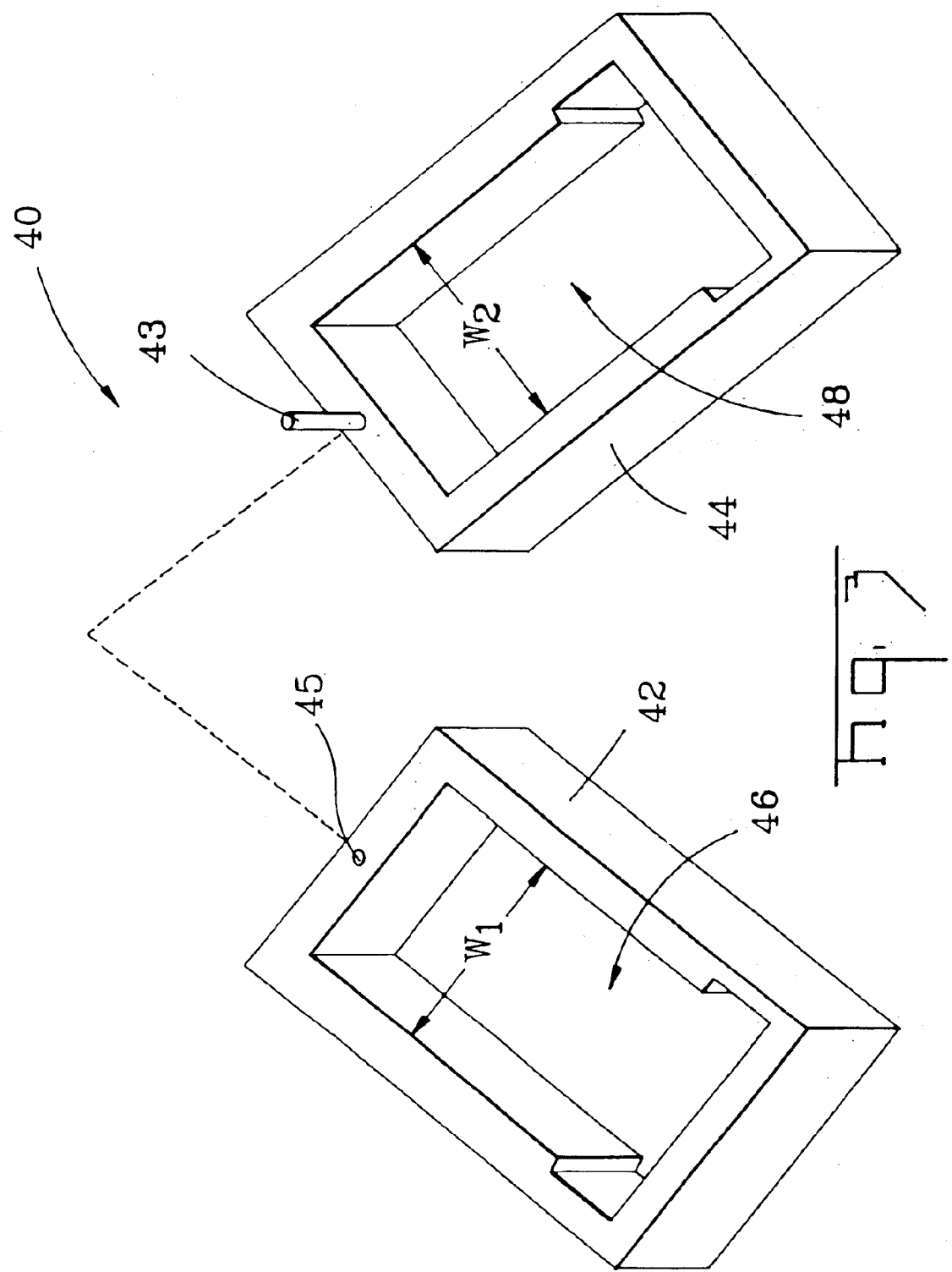

FERRULE HAVING FIRST AND SECOND BODY PORTIONS WITH DIFFERENT NOMINAL WIDTHS AND AN ASSOCIATED MOLD AND FABRICATION METHOD

FIELD OF THE INVENTION

The present invention relates generally to ferrules, molds for forming ferrules and methods for fabricating ferrules and, more particularly, to a ferrule having first and second ferrule body portions that have different nominal widths and an associated mold and fabrication method.

BACKGROUND OF THE INVENTION

Optical fibers are utilized for a variety of applications, including data transmission and the like. In order to interconnect the optical fibers, fiber optic connectors are mounted upon the end portions of the optical fibers, and pairs of the fiber optic connectors are thereafter mated. In order to provide an optical connection with the relatively low attenuation and the small return loss now demanded by many applications, fiber optic connectors are generally designed such that fiber-to-fiber contact is established between the optical fibers upon which the respective fiber optic connectors are mounted. For example, fiber-to-fiber contact is preferably established between each optical fiber of a first fiber optic cable upon which a first fiber optic connector is mounted and the respective optical fibers of a second fiber optic cable upon which a second fiber optic connector is mounted, once the first and second fiber optic connectors have been mated.

In order to establish fiber-to-fiber contact, the front surface of the ferrule of each fiber optic connector must be extremely smooth and planar and must only have minimal, if any, angular errors relative to the optical fiber bores defined by the ferrule. In other words, the front surface of the ferrule preferably defines a planar surface that extends perpendicular to the longitudinal axes of the optical fiber bores. By way of example, the front face of most ferrules must generally have an angular error of less than 0.2° relative to the optical fiber bores to ensure that the optical fibers upon which the ferrule is mounted can be brought into dry physical contact with the optical fibers of another fiber optic connector.

Although ferrules are typically molded to within relatively specific tolerances, the front surfaces of the ferrule are generally unable to be molded to have a sufficiently smooth front surface and to have a sufficiently small angular error. As such, the front surface of the ferrule must typically be polished after the ferrule has been mounted upon the end portions of the optical fibers. Not only does the polishing serve to smooth the front surface and to reduce the angular error of the front surface of the ferrule to within acceptable limits, such as less than 0.2°, but the polishing also serves to ensure that the ends of the optical fibers are properly positioned relative to the front surface of the ferrule, such as by either being flush with the front surface of the ferrule or by protruding by a predetermined amount relative to the front surface of the ferrule.

The front face of the ferrule is generally polished to have a predetermined angular relationship, such as 90°, with respect to the longitudinal axes of the optical fiber bores defined by the ferrule. Since the longitudinal axes of the optical fiber bores are inaccessible for use as a reference point or datum during polishing operations, ferrules are typically designed to have some other reference point or datum that has a predefined positional or angular relationship with respect to the longitudinal axes of the optical fiber bore. As such, the polishing of the front face of the ferrule can be done with respect to the datum that is accessible in order to appropriately polish the front face of the ferrule relative to the longitudinal axes of the optical fiber bores. In this regard, multifiber ferules having a substantially rectangular shape in lateral cross-section, such as an MT ferrule, generally include a shoulder between the ferrule shaft and the enlarged rear portion that serves as the datum for polishing purposes.

In order to take advantage of the efficiencies introduced by the factory assembly of the connectors, it is increasingly desired to polish the front face of the ferrule after the ferrule has been preassembled into a connector. Thus, the datum preferably remains accessible even after the ferrule has been assembled into a connector. As such, the connector can be efficiently assembled and the front face of the ferrule can still be polished after mounting the connector upon end portions of a plurality of optical fibers in the field. Unfortunately, the ferrule shoulder that serves as the datum for rectangular multifiber ferules is generally inaccessible once the connector has been assembled, thereby limiting the preassembly of connectors having rectangular multi fiber ferrules.

A significant portion of the shaft of a rectangular multifiber ferrule is typically accessible even after preassembly of the connector. Thus, consideration has been given to using the exterior surfaces of the shaft portion of a rectangular multifiber ferrule as the datum for polishing purposes, much like the outer diameter of a cylindrical ferrule serves as the polishing datum. Unfortunately, the exterior dimensions of a rectangular multifiber ferrule, cannot generally be defined to within small enough tolerances, such as +/−5 microns, in order to effectively serve as a datum. In this regard, the exterior surfaces of a rectangular multifiber ferrule cannot be formed to within the exacting tolerances required for a polishing datum due to limitations in the molding process.

Rectangular multifiber ferrules are generally formed by injecting a plastic material, such as a thermoplastic or thermoset material, into a mold cavity defined by a pair of mold halves or components that mate along a parting line. Although the mold components can be formed of different materials, the mold components are typically formed of steel, such as D2 steel or stainless steel. The mold cavity as well as the resulting rectangular multifiber ferrule have a nominal thickness and a nominal width. Typically, the thickness of the rectangular multifiber ferrule can be defined to be within a very tight tolerance, such as to within 50 microns, of the nominal thickness during the initial fabrication of the mold. In this regard, the mold components are generally formed by an Electrical Discharge Machine (EDM) that cuts a steel workpiece with a wire. While forming the mold components by cutting a steel workpiece with a wire is efficient, the resulting mold components cannot generally be defined within tight enough tolerances, such as +/−5 microns, to form parts that can serve as a datum during subsequent polishing operations. Thus, the mold components are typically further processed by removing mold material at the parting line of the mold until the thickness of the mold cavity is equal to the desired nominal thickness. For example, mold material is commonly removed from the parting line by a grinding process that is quite accurate.

Unfortunately, the width of a rectangular multifiber ferrule cannot be defined as precisely as the thickness according to conventional fabrication techniques. In this regard, inaccuracies in the width of a rectangular multifiber ferrule generally stem from two different causes. First, the width of the mold cavity as formed by the first and second mold components is not typically defined as precisely as the thickness of the mold cavity. In this regard, even though the mold can be formed such that the mold cavity is slightly undersized, it is relatively difficult to remove mold material from within the portions of the mold cavity defined by the first and second mold components so as to broaden the mold cavity until the actual width of the mold cavity approaches the desired nominal width.

In addition, the second cause for inaccuracies in the width of a rectangular multifiber ferrule stems from offsets that may occur in mating the pair of mold components along the parting line in order to define the mold cavity. In order to reduce the offset between the mold components, the mold is generally keyed such that a pin protruding from one mold component engages a hole defined by the other mold component. Even with the key, however, the mold components can sometimes be slightly offset in a widthwise direction. Since each mold component forms a respective portion of the resulting rectangular multifiber ferrule that has the same nominal width and has the same tolerance as the mold component, any offset between the mold components in a widthwise direction will cause a corresponding offset in the widthwise direction between the respective portions of the rectangular multifiber ferrule, thereby adversely affecting the precision with which the exterior surfaces of a rectangular multifiber ferrule can be defined. As a result of the cumulative effects of the difficulty in precisely defining the nominal width of a mold cavity and the inaccuracies that arise as a result of an offset between the mold components, the exterior surface of a rectangular multifiber ferrule cannot generally be defined with sufficient precision to serve as a datum during polishing operations.

While the shoulder of a rectangular multifiber ferrule serves as an effective datum for polishing purposes, it would be desirable for a rectangular multifiber ferrule to have a datum that is accessible even after the ferrule has been assembled into a connector. As such, the connector could be preassembled in the factory, such as by means of an automated process, and the connector could then be mounted upon the end portions of a plurality of optical fibers and a front face of the ferrule could be polished with respect to the datum in the field. Since the exterior surfaces of a rectangular multifiber ferrule are accessible even after the ferrule has been assembled into a connector, it would be desirable for a rectangular multifiber ferrule to define the exterior surfaces with sufficient precision that the exterior surfaces could serve as the datum for subsequent polishing operations. To date, however, the exterior surfaces of a rectangular multifiber ferrule have not been consistently defined with sufficient precision to effectively serve as a datum during polishing operations.

SUMMARY OF THE INVENTION

According to the present invention, a ferrule is therefore provided that has an exterior surface that can be defined with sufficient precision to serve as a datum during subsequent polishing operations. A mold for forming the ferrule and a method of fabricating the ferrule are also provided according to other aspects of the present invention. Since the exterior surfaces of the resulting ferrule can serve as the datum during such polishing operations, the ferrule can be assembled into a connector prior to mounting the ferrule upon the end portions of a plurality of optical fibers, thereby permitting the ferrule to be preassembled in a factory setting, such as by an automated process.

The ferrule includes first and second ferrule body portions that are joined along a parting line. At least one of the ferrule body portions defines at least one optical fiber bore extending lengthwise through the ferrule. More typically, the first and second ferrule body portions cooperate to define a plurality of optical fiber bores extending lengthwise through the ferrule in order to define a multifiber ferrule.

According to the present invention, the first ferrule body portion has a first width and the second ferrule body portion has a second width that is less than the first width by at least 50 microns. As a result of the difference in the widths of the first and second ferrule body portions, the resulting ferrule typically has a ledge extending lengthwise along the parting line. In addition, the width of the first ferrule body portion is defined to be within a first tolerance, while the width of the second ferrule body is defined to be within a second tolerance that is larger than the first tolerance. For example, the second tolerance of the second ferrule body portion can be at least two times larger than the first tolerance of the first ferrule body portion. As such, the first ferrule body portion is not only larger than the second ferrule body portion, but the first ferrule body portion is also more precisely defined. Thus, only one portion of the ferrule of the present invention needs to be precisely defined, thereby simplifying the fabrication process.

According to the present invention, the first and second ferrule body portions are capable of being offset in a widthwise direction by up to a maximum offset. As such, the first width of the first ferrule body portion is preferably larger than the second width of the second ferrule body portion by at least the sum of the first and second tolerances and two times the maximum offset between the first and second ferrule body portions. As a result of the reduced width of the second ferrule body portion relative to the first ferrule body portion, any offset between the first and second ferrule body portions in a widthwise direction up to the maximum offset will not cause the second ferrule body portion to protrude outwardly beyond the first ferrule body portion in the widthwise direction. As such, the exterior surfaces of the first ferrule body portion can continue to serve as a datum during subsequent polishing operations even though the first and second ferrule body portions may be offset.

By reducing the width of one of the ferrule body portions relative to the other ferrule body portion and by only requiring the larger of the ferrule body portions to be fabricated to an exact tolerance, the ferrule of the present invention is not as susceptible to the two primary causes of inaccuracy in its exterior dimensions. In addition, the precision with which the exterior surfaces of the first ferrule body portion can be defined is not hindered by offsets between the first and second ferrule body portions such that the exterior side surfaces of the ferrule can continue to serve as a datum during polishing operations. In this regard, the ferrule can be more efficiently fabricated since only one of the ferrule body portions needs to be precisely defined in a widthwise direction in order to provide a precision exterior surface that serves as a datum in subsequent polishing operations.

According to another aspect of the present invention, a mold is provided for forming a ferrule, such as a multifiber ferrule. The mold includes first and second mold components that mate along the parting line and that cooperate to define a mold cavity within which the ferrule is formed. The first mold component defines the width of one portion of the mold cavity to within a first tolerance of a first nominal width. Likewise, the second mold component defines the width of another portion of the mold cavity to within a second tolerance of a second nominal width. Notably, the second nominal width of the second mold component is smaller than the first nominal width of the first mold component. For example, the second nominal width of the second mold component can be smaller than the first nominal width of the first mold component by at least 50 microns. In addition, the second tolerance is larger than the first tolerance. For example, the second tolerance of the second mold component can be at least two times larger than the first tolerance of the first mold component. As such, the portion of the ferrule formed by the first mold component is not only wider, but is also defined to within more exacting tolerances than the portion of the ferrule that is concurrently formed by the second mold component. Accordingly, the mold of the present can be more efficiently fabricated since only one of the mold components, i.e., the first mold component, needs to be formed to have a width that is defined to within the more exacting tolerances required to serve as a datum, such as +/−5 microns.

In forming the ferrule, the first and second mold components can be offset in a widthwise direction by up to a maximum offset. According to one advantageous embodiment of the present invention, however, the first nominal width of the first mold component is larger than the second nominal width of the second mold component by at least the sum of the first and second tolerances and two times the maximum offset. As such, the first and second mold components can be offset by up to the maximum offset in the widthwise direction while still permitting the exterior surfaces of that portion of the ferrule formed by the first mold component such that the exterior surfaces of that portion of the ferrule, i.e., the first ferrule body portion, can effectively serve as a datum during subsequent polishing operations.

BRIEF DESCRIPTION OF THE DRAWINGS

FIG. 3 is an exploded perspective view of a mold according to one aspect of the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
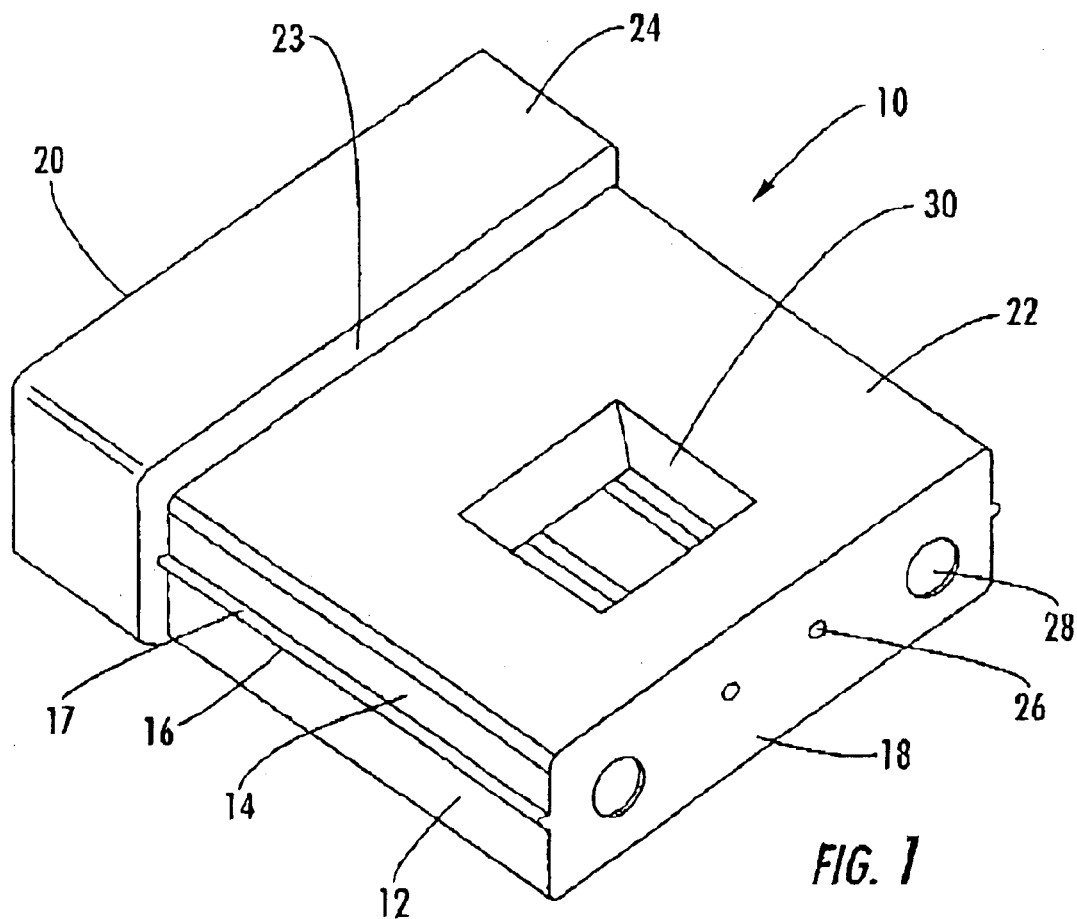
FIG. 1 is a perspective view of a ferrule according to one embodiment of the present invention.

Referring now to FIG. 1, a ferrule 10 of one advantageous embodiment of the present invention is depicted. Since the ferrule is molded as described below, the ferrule includes first and second ferrule body portions 12, 14 joined along a parting line 16 that extends lengthwise between the opposed front and rear surfaces 18, 20 of the ferrule. In this regard, the first and second ferrule body portions cooperate to form both a lengthwise extending shaft portion 22 and an enlarged rear portion 24. The rear portion 24 and the shaft portion 22 are sized differently such that a shoulder 23 is defined therebetween. The first body portion 12 and the second body portion 14 are also sized differently such that the parting line 16 comprises a ledge 17 that extends longitudinally (i.e., in the lengthwise direction) over a majority of the length of the ferrule 10 between the front surface 18 and the rear surface 20. As shown, the ledge 17 extends longitudinally between the front surface 18 and the shoulder 23. Although the ferrule can have various shapes and sizes, the ferrule of one advantageous embodiment has a substantially rectangular shape in lateral cross-section.

At least one of the ferrule body portions defines at least one optical fiber bore 26 and a pair of guide pin openings 28 extending lengthwise through the ferrule. More typically, the first and second ferrule body portions define a plurality of lengthwise extending optical fiber bores as well as the pair of guide pin openings. As a result, the ferrule is typically a multifiber ferrule, such as MT-type ferrule. As shown in FIG. 1, one of the ferrule body portions, such as the second ferrule body portion, also typically defines a window 30 extending through its major surface such that each of the optical fiber bores are exposed therethrough. As such, epoxy can be injected through the window and into the optical fiber bores in order to secure the end portions of a plurality of optical fibers therein, as known to those skilled in the art.

Figure 2:
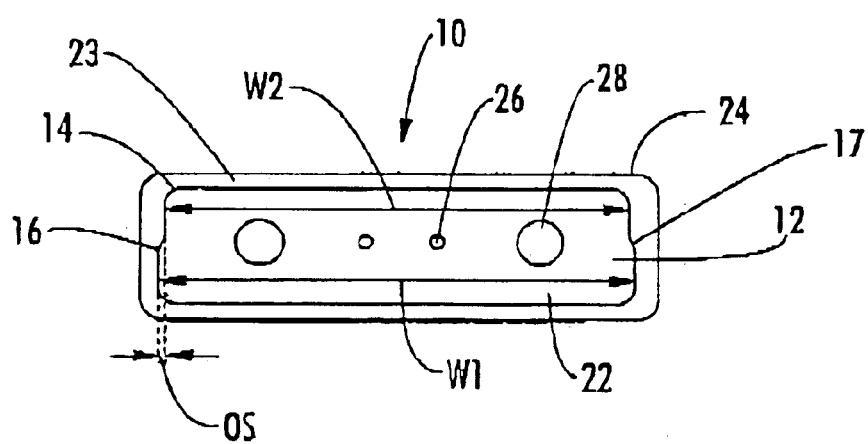
FIG. 2 is a front plan view of the ferrule of FIG. 1.

As shown in more detail in FIG. 2, the first ferrule body portion 12 has a first width $w_1$. Likewise, the second ferrule body portion 14 has a second width $w_2$. According to the present invention, the second width $w_2$ of the second ferrule body 14 portion is smaller than the first width $w_1$ of the first ferrule body portion 12. As described below, the difference in the respective widths of the first and second ferrule body portions are intentionally introduced and are not attributable to inadvertent differences in width that may sometimes arise as a result of inaccuracies during the fabrication of the mold components. In this regard, the first width of the first ferrule body portion is preferably larger than the second width of the second ferrule body portion by at least 50 microns, although the widths of the respective ferrule body portions can differ by other amounts if so desired.

Not only are the widths of the first and second ferrule body portions 12, 14 different, but the widths of the first and second ferrule body portions are also defined to be within different tolerances. In this regard, the width $w_1$ of the first ferrule body portion is defined to within a first tolerance $t_1$, while the width $w_2$ of the second ferrule body portion is defined to within a second tolerance $t_2$. In particular, the width of the second ferrule body portion is defined to be within a second tolerance that is larger than the first tolerance to which the width of the first ferrule body portion is defined. Thus, the first ferrule body portion is not only larger, but is also more precisely defined than the second ferrule body portion. The difference between the tolerances to which the widths of the first and second ferrule body portions are defined can vary depending upon the application. As the example set forth below will illustrate, however, the second tolerance of the second ferrule body portion is typically at least two times larger than the first tolerance of the first ferrule body portion. Nonetheless, the difference in the tolerances to which the widths of the first and second ferrule body portions are defined is generally significantly less than the difference in the actual widths of the first and second ferrule body portions, as also described below.

By loosening the tolerance to which the width of the second ferrule body portion 14 is defined, the ferrule 10 can be fabricated in a more cost effective manner since only the first ferrule body portion 12 needs to be defined to within the more exacting tolerances in the widthwise direction. As a result of the differences in the widths of the first and second ferrule body portions, however, the variations in the width of the second ferrule body portion will not cause the second ferrule body portion to protrude beyond the first ferrule body portion. As a result, the exterior surfaces of the first ferrule body portion can serve as a datum during subsequent polishing operations, as described hereinbelow.

As a result of the differences in the widths of the first and second ferrule body portions, 12, 14 the ferrule 10 of the present invention can also accommodate offsets between the first and second ferrule body portions. In this regard, any offset os in the widthwise direction between the first and second ferrule body portions will not cause the second ferrule body portion to protrude beyond the first ferrule body portion in the widthwise direction so long as the first width of the first ferrule body portion is larger than the second width of the second ferrule body portion by at least the sum of the first and second tolerances and two times the offset between the first and second ferrule body portions, that is, $w_1-w_2 \geq 2os+t_1+t_2$. As such, the ferrule of the present invention can be designed to be impervious to offsets in a widthwise direction up to a maximum offset by defining the first width of the first ferrule body portion to be larger than the second width of the second ferrule body portion by at least the sum of the first and second tolerances and two times the maximum offset.

By appropriately sizing the first and second ferrule body portions 12, 14 in a widthwise direction, neither the offset os between the first and second ferrule body portions nor the increased tolerance $t_2$ of the second ferrule body portion will cause the second ferrule body portion to protrude beyond the first ferrule body portion in the widthwise direction. As such, the exterior side surfaces of the first ferrule body portion can serve as the datum for reference purposes during subsequent polishing operations, including those polishing operations that occur following assembly of the ferrule 10 into a connector.

In order to polish the ferrule 10, the forward end of the shaft portion 22 of the ferrule of the present invention can be engaged by a polishing fixture that grasps the side surfaces of the first ferrule body portion. In this regard, it is noted that the first ferrule body portion 12 has sufficient exterior side surfaces to be securely held by the polishing fixture without having to grasp the exterior side surfaces of the second ferrule body portion 14. Thereafter, the front surface 18 the ferrule and the end faces of the optical fibers upon which the ferrule is mounted can be brought into contact with the polishing media and the front face of the ferrule and the end faces of the optical fibers can be polished.

Although the ferrule 10 of the present invention can have a variety of shapes and sizes, the ferrule of one exemplary embodiment will be described in more detail hereinbelow for purposes of illustration and not of limitation. In this regard, a rectangular multifiber ferrule is molded that has an enlarged rear portion 24 and a lengthwise extending shaft portion 22. While the enlarged rear portion has a length of 1.83 millimeters, a thickness of 3 millimeters, and a width of 5.05 millimeters, the shaft portion has a length of 8 millimeters and a thickness of 2.45 millimeters. According to the present invention, the first ferrule body portion 12 is somewhat wider than the second ferrule body portion 14. In this embodiment, for example, the portion of the shaft that is formed by the first ferrule body portion has a width of 4.4 millimeters, while the portion of the shaft formed by the second ferrule body portion has a width of 4.3 millimeters. As such, the width of the shaft that is formed by the first ferrule body portion is 100 microns greater than the width of the shaft that is formed by the second ferrule body portion.

In addition, the width of the first ferrule body portion 12 is also defined to within more exacting tolerances than the width of the second ferrule body portion 14. In this exemplary embodiment, the width of the first ferrule body portion is defined to within 5 microns. In contrast, the width of the second ferrule body portion is only defined to within ±20 microns. As such, only the first ferrule body portion needs to be formed to precise dimensions since the second ferrule body portion is smaller and can be formed to much looser tolerances. As a result of the differences in width of the first and second ferrule body portions, the ferrule body portions can be offset by at least 37.5 microns, and perhaps more, depending upon the actual width variations of the first and second ferrule body portions from the first and second nominal widths, without causing the smaller second ferrule body portion to protrude outwardly beyond the larger first ferrule body portion. Thus, the first ferrule body portion can continue to serve as a datum during polishing operations even though the second ferrule body portion is offset in a widthwise direction relative to the first ferrule body portion. Thus, the ferrule 10 of this aspect of the present invention also serves to loosen the requirement regarding the offset of the first and second ferrule body portions in a widthwise direction.

According to another aspect of the present invention, a mold 40 and an associated method for fabricating a ferrule 10, such as the ferrule described above, is provided. In this regard, the mold includes first and second mold components 42, 44 that mate along a parting line and that cooperate to define a mold cavity within which the ferrule is formed. As shown, the mold components are typically keyed such that one of the mold components has a key, such as a pin 43, and the other mold component has an opening 45 for receiving the key in order to align the mold components and reduce offsets during the mating process. In this regard, the first mold component generally defines a first portion 46 of the mold cavity that will serve to form the first ferrule body portion 12, while the second mold component defines a second portion 48 of the mold cavity that will define the second ferrule body portion.

According to the present invention, the first portion 46 of the mold cavity defined by the first mold component 42 has a first nominal width $w_1$ and the second portion 48 of the mold cavity defined by the second mold component 44 has a second nominal width $w_2$. In particular, the second nominal width defined by the second mold component is smaller than the first nominal width defined by the first mold component. As such, the second ferrule body portion 14 formed by the second mold component will not be as wide as than the first ferrule body portion 12 formed by the first mold component, as described above. While the respective widths of the first and second mold components may differ by various amounts depending upon the application, the second nominal width of the second portion of the mold cavity is smaller than the first nominal width of the first portion of the mold cavity by at least 50 microns in one embodiment such that the resulting ferrule 10 will have a second ferrule body portion that is also smaller than the first ferrule body portion by at least 50 microns as well.

According to the present invention, the first mold component 42 defines the width of the first portion 46 of the mold cavity to within a first tolerance. Likewise, the second mold component 44 defines the width of the second portion 48 of the mold cavity to within a second tolerance that is larger than the first tolerance. As such, the first ferrule body portion 12 formed by the first mold component will have a width defined to within the first tolerance, while the second ferrule body portion 14 defined by the second mold component will have a width defined to within the second tolerance that, by definition, is larger than the first tolerance. While the difference in the first and second tolerances can vary depending upon the application, the second tolerance is generally substantially larger than the first tolerance and, in one embodiment, is at least two times larger than the first tolerance.

Typically, the first and second mold components 42, 44 are cut from a workpiece, such as a steel workpiece and, more particularly, such as a D2 steel or stainless steel workpiece. Generally, the first and second mold components are cut from the workpiece by an electrostatic discharge machine that moves a wire through the workpiece according to a predefined pattern. While the EDM formation of the first and second mold components defines the respective portions of the mold cavity to within relatively loose tolerances, such as +/−20 microns, the EDM process does not generally form the respective portions of the mold cavity defined by the first and second mold components to be within the relatively tight tolerances required to fabricate a structure that will subsequently serve as a datum during precision polishing operations. In other words, the EDM process generally does not form the first portion 46 of the mold cavity defined by the first mold component to within a tolerance of +/−5 microns as required in order for the exterior side surfaces of the resulting first ferrule body portion 12 to serve as a datum during polishing operations.

As such, the first portion 46 of the mold cavity defined by the first mold component 42 is generally formed somewhat undersized by the EDM process. Thereafter, additional material is removed from within the first portion of the mold cavity defined by the first mold component by machining or grinding in order to precisely define the width of the first portion of the mold cavity to be within very strict tolerances of the first nominal width, such as +/−5 microns. While this machining or grinding process is relatively time consuming and somewhat expensive as a result of having to remove material from the interior of a mold component, only one of the first and second mold components would be ground following the EDM process in order to form the mold 40 of the present invention. In this regard, the second portion 48 of the mold cavity defined by the second mold component 44 can be defined to within much looser tolerances, such as typically provided EDM wire cutting. Thus, the cost and efficiency of fabricating the mold of the present invention is therefore improved relative to the fabrication of conventional molds in which the portions of the mold cavity is defined by both mold components have to be precisely defined.

As described above, the difference in the nominal widths of the respective portions of the mold cavity defined by the first and second mold components 42, 44 is preferably selected such that the difference in the nominal widths is at least as great as the sum of the first and second tolerances and two times the maximum anticipated offset between the first and second ferrule body portions 12, 14 in a widthwise direction. As such, the ferrule 10 formed by the mold 40 of the present invention can accommodate relative offsets between the first and second ferrule body portions in a widthwise direction without causing the smaller second ferrule body portion to protrude outwardly beyond the first ferrule body portion. As such, the first ferrule body portion can continue to serve as the datum during polishing operations, even after the ferrule has been assembled into a connector.

While the mold 40 of the present invention can form a single fiber ferrule defining a single optical fiber bore, the mold of the present invention preferably forms a multifiber ferrule 10 defining a plurality of optical fiber bores 26 and a pair of guide pin openings 28. As such, the mold can also include a plurality of pins that extend lengthwise through the mold cavity to define the optical fiber bores and the pair of guide pin openings. In addition, the mold can include internal features that define the window 30 in the second ferrule body portion 14 and that define an internal cavity within the ferrule that leads an opening in the rear surface 18 of the ferrule into the optical fiber bores. For purposes of clarity, however, FIG. 3 does not depict these other conventional internal features that may be positioned with the mold cavity.

During the process of fabricating a ferrule 10, a ferrule is formed within the mold cavity defined by the mold 40. While the ferrule can be formed of various materials, the ferrule of one advantageous embodiment is formed of a thermoset plastic that is injected into the mold cavity that is defined once the first and second a mold components 42, 44 are mated and the pins or other molding features have been inserted into the mold cavity. Once the material forming the ferrule has cured, the ferrule is removed from the mold.

As described above, the first ferrule body portion 12 is formed in the first mold component 42 to within a first tolerance of a first nominal width. Similarly, the second ferrule body portion 14 is concurrently formed in the second mold component 44 to within a second tolerance of a second nominal width. As also described above, the second nominal width defined by the second ferrule body portion is smaller than the first nominal width defined by the first ferrule body portion. In addition, the second tolerance of the second ferrule body portion is larger than the first tolerance of the first ferrule body portion. As a result, only one of the mold components, namely, the first mold component, needs to define the respective portion of the mold cavity with the enhanced precision demanded for forming a component that will subsequently serve as a datum during polishing operations. In this regard, the first mold component typically defines the width of the first portion 46 of the mold cavity to within about ±5 microns, while the second mold component defines the second portion 48 of the mold cavity to within a much lesser tolerance, such as ±20 microns. Since the nominal width of the second ferrule body portion is significantly smaller than the nominal width of the first ferrule body portion, the ferrule body portions can be somewhat offset in a widthwise direction, as described above, without causing the smaller second ferrule body portion to protrude outwardly beyond the first ferrule body portion. As such, the first ferrule body portion can continue to serve as the datum during polishing operations even though the second ferrule body portion has a width that is more loosely defined and even though the first and second ferrule body portions may be somewhat offset.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A ferrule comprising:
   at least one optical fiber bore associated with a front surface an a rear surface of said ferrule; and first and second body portions extending at least partially between said surfaces and having respective widths, a juncture of said body portions comprising interface in the form of a parting line on an exterior surface of the ferrule, said parting line extending longitudinally over a majority of the ferrule between said front surface and said rear surface, and said parting line defining an offset of at least about 50 microns between said first and second body portions.

2. A ferrule according to claim 1 wherein the width of said first ferrule body portion is defined to within a first tolerance, and wherein the width of said second ferrule body portion is defined to within a second tolerance that is larger than the first tolerance.

3. A ferrule according to claim 2 wherein the second tolerance of said second ferrule body portion is at least two times larger than the first tolerance of said first ferrule body portion.

4. A ferrule according to claim 2 wherein said first and second ferrule body portions are capable of being offset in a widthwise direction by up to a maximum offset, and wherein the first width of said first ferrule body portion is larger than the second width of said second ferrule body portion by at least the sum of the first tolerance, the second tolerance, and two times the maximum offset between said first and second ferrule body portions.

5. A ferrule according to claim 1, said parting line comprising a ledge.

6. A ferrule according to claim 1, said ferrule comprising multiple bores and defining a multifiber ferrule.

7. A ferrule comprising:
at least one optical fiber bore; and
first and second ferrule body portions joined along a parting line, said first ferrule body portion having a first width and said second ferrule body portion having a second width that is smaller than the first width by at least about 50 microns, the width of said second ferrule body portion is defined to within a first tolerance, and the width of said second ferrule body portion is defined to within a second tolerance that is larger than the first tolerance.

8. A ferrule according to claim 7 wherein the second tolerance of said second ferrule body portion is at least two times larger than the first tolerance of said first ferrule body portion.

9. A ferrule according to claim 8 wherein said first and second ferrule body portions are capable of being offset in a widthwise direction by up to a maximum offset, and wherein the first width of said first ferrule body portion is larger than the second width of said second ferrule body portion by at least the sum of the first tolerance, the second tolerance, and two times the maximum offset between said first and second ferrule body portions.

10. A ferrule according to claim 7 wherein the first and second ferrule body portions cooperate to define a ledge.

11. A ferrule according to claim 7 wherein the ferrule is a multifiber ferrule.

12. A ferrule comprising:
at least one optical fiber bore extending from a front surface to a rear surface of said ferrule; a shaft portion defining exterior surfaces of said ferrule, said exterior surfaces at least partially extending longitudinally between said front and rear surfaces; and a width transition, said width transition extending longitudinally along a majority of said exterior surfaces of said ferrule shaft portion, said width transition comprising a width offset, wherein the width transition is formed by a first ferrule body portion and a second ferrule body portion, the first body portion being defined to within a first tolerance, and a second body portion being defined to within a second tolerance that is larger than the first tolerance.

13. A ferrule according to claim 12 wherein the second tolerance of said second ferrule body portion is at least two times larger than the first tolerance of the first ferrule body portion.

14. A ferrule according to claim 12 wherein the width transition is formed by a first ferrule body portion and a second ferrule body portion, the first and second body portions cooperate to define a ledge.

15. A ferrule according to claim 12 wherein the ferrule is a multifiber ferrule.

16. A ferrule comprising:
at least one optical fiber bore extending from a front surface to a rear surface of said ferrule;
a shaft portion, said shaft portion comprising at least two exterior surfaces extending at least partially between said front surface and said rear surface, said at least two exterior surfaces comprising respective widths, the width of one of said surfaces being defined to within a first tolerance, and the width of the other of said at least two surfaces being defined to within a second tolerance that is larger than the first tolerance.

17. A ferrule according to claim 16 wherein the second tolerance is at least two times larger than the first tolerance.

18. A ferrule according to claim 16 wherein the two exterior surfaces cooperate to define a ledge.

19. A ferrule according to claim 16, wherein the ferrule is a multifiber ferrule.

20. A ferrule comprising:
at least one optical fiber bore extending from a front surface to a rear surface of said ferrule; and
monolithically formed first and second body portions, an exterior surface of the first body portion defined to within a first tolerance, and an exterior surface of the second body portion defined to within a second tolerance that is larger than the first tolerance.

21. A ferrule according to claim 20 wherein the second tolerance is at least two times larger than the first tolerance.

22. A ferrule according to claim 20 wherein the first and second body portions cooperate to define a ledge.

23. A ferrule according to claim 20 wherein ferrule is a multifiber ferrule.

24. A ferrule comprising:
a first body portion and a second body portion joined along a parting line that extends lengthwise between a front surface and an opposed rear surface; and
at least one optical fiber bore extending lengthwise between the front surface and the rear surface;
wherein the first body portion has a first width and the second body portion has a second width different than the first width such that the parting line comprises ledge that extends in the lengthwise direction over a majority of the length of the ferrule between the front surface and the rear surface.

25. A ferrule according to claim 24 wherein the first body portion and the second body portion cooperate to form a lengthwise extending shaft portion and a lengthwise extending rear portion that is enlarged relative to the shaft portion such that a shoulder is defined between the rear portion and the shaft portion.

26. A ferrule according to claim 24 wherein the first width of the first body portion is defined to within a first tolerance and the second width of the second body portion is defined to within a second tolerance that is larger than the first tolerance.

27. A ferrule according to claim 24 wherein the ferrule is a multifiber ferrule.

28. A ferrule according to claim 26
wherein the first body portion and the second body portion are capable of being offset in a widthwise direction by up to a maximum offset; and wherein the first width of the first body portion is larger than the second width of the second body portion by at least the sum of the first tolerance, the second tolerance, and two times the maximum offset between the first body portion and the second body portion.

* * * * *

UNITED STATES PATENT AND TRADEMARK OFFICE
CERTIFICATE OF CORRECTION

PATENT NO. : 6,761,489 B1
DATED : July 13, 2004
INVENTOR(S) : Dean, Jr. et al.

It is certified that error appears in the above-identified patent and that said Letters Patent is hereby corrected as shown below:

Column 11,
Line 37, delete the word "second" and insert the word -- first --

Column 12,
Line 55, insert the word -- a -- after the word "comprises" and before the word "ledge"

Signed and Sealed this

Thirtieth Day of November, 2004

JON W. DUDAS
*Director of the United States Patent and Trademark Office*